United States Patent
Hiltunen et al.

(10) Patent No.: US 12,305,133 B2
(45) Date of Patent: May 20, 2025

(54) METHOD AND APPARATUS FOR REMOVING IMPURITIES FROM GASIFICATION GAS AND USE

(71) Applicant: TEKNOLOGIAN TUTKIMUSKESKUS VTT OY, Espoo (FI)

(72) Inventors: Ilkka Hiltunen, Vtt (FI); Esa Kurkela, Vtt (FI)

(73) Assignee: TEKNOLOGIAN TUTKIMUSKESKUS VTT OY, Espoo (FI)

(*) Notice: Subject to any disclaimer, the term of this patent is extended or adjusted under 35 U.S.C. 154(b) by 388 days.

(21) Appl. No.: 17/765,745

(22) PCT Filed: Oct. 7, 2020

(86) PCT No.: PCT/FI2020/050662
§ 371 (c)(1),
(2) Date: Mar. 31, 2022

(87) PCT Pub. No.: WO2021/069799
PCT Pub. Date: Apr. 15, 2021

(65) Prior Publication Data
US 2022/0403266 A1    Dec. 22, 2022

(30) Foreign Application Priority Data
Oct. 8, 2019 (FI) .................................. 20195859

(51) Int. Cl.
*C10K 3/02* (2006.01)
(52) U.S. Cl.
CPC .................... *C10K 3/023* (2013.01)

(58) Field of Classification Search
CPC ... C10K 3/023; C01B 3/40; C01B 2203/0261; C01B 2203/1005; C01B 2203/1058;
(Continued)

(56) References Cited

U.S. PATENT DOCUMENTS

| | | |
|---|---|---|
| 2004/0039069 A1 | 2/2004 | Kiuchi |
| 2009/0324471 A1* | 12/2009 | Simell ............... C10K 3/02 423/215.5 |

(Continued)

FOREIGN PATENT DOCUMENTS

| | | |
|---|---|---|
| FI | 116944 B | 4/2006 |
| JP | 2004075438 A | 3/2004 |

(Continued)

OTHER PUBLICATIONS

Finnish Search Report for FI20195859 prepared by the Finnish Patent Office, dated Apr. 20, 2020, 1 page.
(Continued)

*Primary Examiner* — Dung H Bui
(74) *Attorney, Agent, or Firm* — Brooks Kushman P.C.

(57) ABSTRACT

The invention relates to a method and an apparatus for removing impurities from a gasification gas, wherein the gasification gas which includes at least tars and/or undesired hydrocarbons is supplied to a catalytic reformer which has at least one catalyst bed, oxygen containing gas is injected onto the surface of the catalyst bed, the gasification gas is arranged to flow through the catalyst bed and arranged to contact with the oxygen containing gas in the catalyst bed, and a purified gas is discharged from the catalytic reformer. Further, the invention relates to the use of the method.

14 Claims, 1 Drawing Sheet

(58) Field of Classification Search
CPC .... C01B 2203/1064; C01B 2203/1205; C01B 3/386; C10J 3/02
See application file for complete search history.

(56) References Cited

U.S. PATENT DOCUMENTS

| | | |
|---|---|---|
| 2011/0062387 A1 | 3/2011 | Anfang et al. |
| 2012/0001125 A1 | 1/2012 | Oguro et al. |
| 2013/0047511 A1* | 2/2013 | Simell ................... C10J 3/482 48/197 R |
| 2013/0058855 A1* | 3/2013 | Toppinen ............... C01B 3/386 423/245.1 |
| 2015/0275111 A1 | 10/2015 | Chandran |

FOREIGN PATENT DOCUMENTS

| | | | |
|---|---|---|---|
| JP | 2009280633 A | 12/2009 | |
| JP | 2010111779 A | 5/2010 | |
| WO | 2011107661 A1 | 9/2011 | |

OTHER PUBLICATIONS

International Search Report for PCT/FI2020/050662, Prepared by the European Patent Office, mailing date Jan. 27, 2021, 5 pages.
JPOA "Brief Description of Notice of Reasons for Rejection" Ref. No. F86517A1, Mailing No. 495679, Application No. 2022-521357, Oct. 15, 2024, 4 Pages.

* cited by examiner

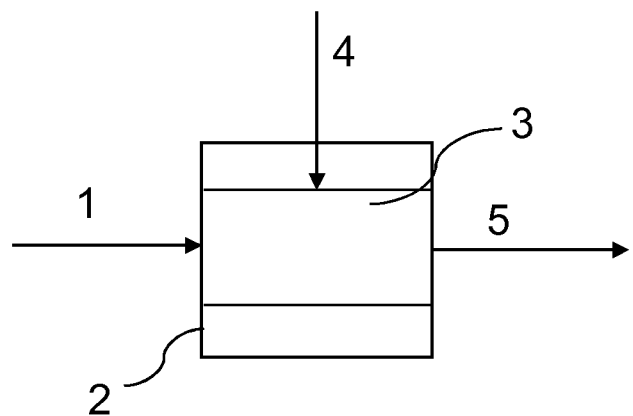

METHOD AND APPARATUS FOR REMOVING IMPURITIES FROM GASIFICATION GAS AND USE

CROSS-REFERENCE TO RELATED APPLICATION

This application is the U.S. national phase of PCT Application No. PCT/FI2020/050662 filed on Oct. 7, 2020, which claims priority to FI patent application No. 20195859 filed on Oct. 8, 2019, the disclosures of which are incorporated in their entirety by reference herein.

FIELD

The application relates to a method and an apparatus for removing impurities from gasification gas. Further, the application relates to a use of the method.

BACKGROUND

Known from the prior art is to gasify different biomass and waste raw materials in gasifiers and to produce gasification gases. Further, it is known that the gasification gases comprise impurities, such as tars, some hydrocarbons and other compounds. Further, different gas cleaning methods are known from the prior art. The gasification gas can be cleaned by washing by means of many washing stages. However, the light hydrocarbons cannot be separated by washing. Further, it is known that the gasification gas can be cleaned by means of a catalytic reformer in which tars and hydrocarbons can be converted to products. However, a construction of the reformer is complicated with several different parts and process steps. Further, polyaromatic hydrocarbons (PAH) and carbon black form during the catalytic reforming.

OBJECTIVE

The objective is to solve the above problems. Further, the objective is to disclose a new type method and apparatus for removing tars and other impurities from the gasification gas and for purifying said gas. Further, the objective is to disclose a new type method and apparatus for treating the gasification gas and for decomposing impurities. Further, the objective is to improve a quality of the gasification gas.

SUMMARY

The method and apparatus and use are characterized by what are presented in the claims.

In the method and apparatus, the gasification gas which comprises at least tars and/or undesired hydrocarbons is treated in a catalytic reformer comprising at least one catalyst bed.

BRIEF DESCRIPTION OF THE DRAWINGS

The accompanying drawing, which is included to provide a further understanding of the invention and constitutes a part of this specification, illustrates some embodiment of the invention and together with the description help to explain the principles of the invention. In the drawings:

FIG. 1 is a flow chart illustration of a process according to one embodiment.

DETAILED DESCRIPTION

In a method for removing impurities by conversion from gasification gas, the gasification gas (1) which comprises at least tars and/or undesired hydrocarbons is supplied to a catalytic reformer (2) which comprises at least one catalyst bed, oxygen containing gas (4) is injected onto the surface of the catalyst bed, the gasification gas (1) is arranged to flow through the catalyst bed (3) and arranged to contact with the oxygen containing gas (4) in the catalyst bed, and a purified gas (5) is discharged from the catalytic reformer (2). The gasification gas is treated with the oxygen containing gas by means of a catalytic oxidation and reforming in the catalyst bed, wherein the impurities can be converted and a purified gas (5) is formed.

An apparatus for removing impurities from a gasification gas comprises at least one catalytic reformer (2) to which the gasification gas (1) which comprises at least tars and/or undesired hydrocarbons is supplied, and the catalytic reformer (2) comprises at least one catalyst bed. Further, the apparatus comprises at least one injection device for injecting oxygen containing gas (4) onto the surface of the catalyst bed. In the reformer (2), the gasification gas (1) is arranged to flow through the catalyst bed (3) and arranged to contact with the oxygen containing gas (4) in the catalyst bed in order to convert the impurities and to form a purified gas.

One embodiment of the method and the apparatus is shown in FIG. 1.

In this context, the gasification gas (1) means any gasification gas, such as gasification gas, synthesis gas or other gasification gas, which comprises at least tars and/or undesired hydrocarbons as impurities. The gasification gas can consist of one or more main components. The gasification gas can comprise carbon dioxide, carbon monoxide, hydrogen and/or methane as the main components. Further, the gasification gas can comprise also other components, e.g. inert components, dust, particulates and/or water. Further, the gasification gas can comprise other impurities. In one embodiment, at least tars are decomposed by the present method. In one embodiment, at least undesired hydrocarbons, e.g. benzene, are decomposed by the present method. In one embodiment, the gasification gas is a flow from a gasifier. In one embodiment, the gasification gas has been filtrated after the gasifier.

In this context, the oxygen containing gas (4) means any gas, such as a reaction gas, which includes at least oxygen. The oxygen containing gas can consist of one or more main components. In one embodiment, the oxygen containing gas consists of air. In one embodiment, the oxygen containing gas consists of oxygen. In one embodiment, the oxygen containing gas comprises at least oxygen and nitrogen. In one embodiment, the oxygen containing gas comprises at least oxygen and water steam. In one embodiment, the oxygen containing gas comprises at least oxygen and carbon dioxide. In one embodiment, the oxygen containing gas comprises at least oxygen, and further nitrogen, water steam and/or carbon dioxide. In one embodiment, the oxygen containing gas is used as a reactant in the catalytic reformer (2). The content of oxygen can vary in the oxygen containing gas. In one embodiment, the content of oxygen in the oxygen containing gas is 10-100 vol-%, in one embodiment 20-50 vol-%.

In one embodiment, the catalytic reformer (2) comprises one catalyst bed (3). In one embodiment, the catalytic reformer comprises more than one catalyst bed (3). In one embodiment, the catalytic reformer comprises at least two catalyst beds (3). In one embodiment, the catalytic reformer comprises two catalyst beds (3).

In this context, the catalyst bed means any catalyst bed or layer in the catalytic reformer. In one embodiment, the catalyst bed is formed from the catalyst particles. In one embodiment, the catalyst bed is formed from the catalyst elements in which the elements have been coated by the catalyst or catalysts.

In one embodiment, the catalyst bed (3) comprises at least one catalyst. In one embodiment, the catalyst bed is formed from one catalyst. In one embodiment, the catalyst bed (3) comprises more than one catalyst. In one embodiment, the gasification meets the oxygen in a surface part, e.g. surface zone, of the catalyst bed. In one embodiment, the catalyst bed is formed from a first catalyst and the surface of the catalyst bed is formed from a second catalyst. In one embodiment, the gasification meets the oxygen in the zone of the second catalyst.

In one embodiment, the catalyst is selected from metal or noble metal or other suitable catalyst. In one embodiment, the catalyst bed is formed from Ni-catalyst. In one embodiment, the catalyst bed is formed from noble metal catalyst. In one embodiment, the catalyst bed is formed from Ni-catalyst and noble metal catalyst. In one embodiment, the second catalyst arranged on the surface of the catalyst bed is formed from a robust catalyst which can stand high temperatures and where oxygen can be consumed by combustion reactions. In one embodiment, the first catalyst of the catalyst bed is metal and/or noble metal catalyst. In one embodiment, the second catalyst of the catalyst bed is Ni-catalyst, e.g. with lower Ni-content than the first catalyst. In one embodiment, the second catalyst is formed heat shield material with low nickel or noble metal content. In one embodiment, the first catalyst is formed from nickel and/or noble metal.

The gasification gas (1) reacts with the oxygen containing gas (4) in the catalyst bed (3). In one embodiment, the gasification gas (1) reacts with the oxygen containing gas (4) on the surface of the catalyst particles in the catalyst bed (3). In one embodiment, the gasification gas (1) reacts with the oxygen containing gas (4) in the pores of the catalyst in the catalyst bed (3). In one embodiment, the gasification gas (1) reacts with the oxygen containing gas (4) on the surface of the catalyst particles or in the pores of the catalyst particles in the catalyst bed. When the gas reacts with the oxygen containing gas in the catalyst bed, PAH compounds and carbon black do not form and a deactivation of the catalyst can be avoided.

In one embodiment, the catalyst bed (3) is arranged to a desired part of the catalytic reformer (2).

In this context, the catalytic reformer (2) means any reformer which comprises at least one catalyst bed. The catalytic reformer (2) can be a separate device or a part of another device, e.g. a part of the gasifier.

In one embodiment, the oxygen containing gas (4) is injected by a direct injection onto the surface of the catalyst bed (3). In one embodiment, the injection device is arranged to inject oxygen containing gas (4) by a direct injection onto the surface of the catalyst bed. The injection device for injecting the oxygen containing gas (4) to the catalytic reformer (2) can be any injection device, injector or other suitable injecting equipment.

In one embodiment, the apparatus comprises at least one oxygen containing gas feed inlet for supplying the oxygen containing gas (4) onto the surface of the catalyst bed (3). In one embodiment, the oxygen containing gas is supplied onto the catalyst bed by means of at least two oxygen containing gas feed inlets. Preferably, the oxygen containing gas is supplied always onto the surface of the catalyst bed (3).

In one embodiment, the apparatus comprises at least one gasification gas feed inlet for supplying the gasification gas (1) into the catalytic reformer (2). The gasification gas (1) is fed into the catalytic reformer (2) and arranged to flow through the catalyst bed. In one embodiment, the gasification gas (1) is fed before the catalyst bed (3) or directly to the catalyst bed (3) in the catalytic reformer (2). In one embodiment, the gasification gas feed inlet is arranged in connection with the catalyst bed (3) of the catalytic reformer (2). In one embodiment, the gasification gas feed inlet is arranged before the catalyst bed (3) in the catalytic reformer (2).

In one embodiment, the apparatus comprises at least one outlet for discharging the purified gas (5) out from the catalytic reformer (2).

The oxygen containing gas feed inlet and gasification gas feed inlet may be any suitable inlets known per se, e.g. pipe, port or the like. The outlet may be any suitable outlet known per se, e.g. pipe, outlet port or the like.

In one embodiment, temperature of the gasification gas (1) is 300-900° C., in one embodiment 500-850° C., when the gasification gas is supplied to the catalytic reformer (2). In one embodiment, temperature of the purified gas (5) is 800-960° C., in one embodiment 850-950° C., when the purified gas is discharged from the catalytic reformer (2).

The feed rate of the oxygen containing gas is 5-100 m/s to the catalyst bed of the catalytic reformer. In one embodiment, the feed rate of the oxygen containing gas is 10-95 m/s, in one embodiment 20-90 m/s and in one embodiment 30-80 m/s, to the catalyst bed of the catalytic reformer. In one embodiment, a feed rate of the gasification gas is 0.1-3 m/s, in one embodiment 0.3-2 m/s, to the catalyst bed of the catalytic reformer. Preferably, there is sufficient difference between the feed rates of the oxygen containing gas and the gasification gas when the oxygen containing gas and the gasification gas are supplied to the catalyst bed.

The purified gas (5) is formed in the catalytic reformer. In one embodiment, the tar content of the gas can be decreased. In one embodiment, the undesired hydrocarbon content of the gas can be decreased.

In one embodiment, the purified gas (5) can be treated, post-treated or supplied to a next process or a next process step after the catalytic reformer. In one embodiment, the purified gas is filtrated. In one embodiment, the purified gas can be supplied to a desired treatment process, e.g. for forming hydrocarbons.

In one embodiment, the apparatus comprises more than one catalytic reformer. In one embodiment, at least two or more catalytic reformers are arranged in parallel. In one embodiment, at least two or more catalytic reformers are arranged sequentially.

In one embodiment, the method is based on a continuous process. In one embodiment, the apparatus is a continuous apparatus. In one embodiment, the method can be based on a batch process if the apparatus comprises at least two parallel catalytic reformers.

In one embodiment, the apparatus and the method can be used and utilized in a purification of the gasification gas, a production of the gasification gas, a production of hydrocarbons, a production of methanol, a production of hydrogen, manufacturing of fuels, or their combinations. In one embodiment, the apparatus and the method can be used to purify hot gases, e.g. pressurized hot gases. In one embodiment, the apparatus and the method can be used to purify gases from an oxygen gasification or steam gasification.

Thanks to the invention the gasification gas can be purified, and tars and/or undesired hydrocarbons can be decomposed and converted easily and effectively. Further, carbon black does not form or forming of the carbon black can be decreased significantly. Then glogging and blocking of the catalyst bed can be avoided, and pressure difference can be decreased in the catalyst bed. When the oxygen containing gas is fed onto the surface of the catalyst bed and the oxygen containing gas is arranged to contact with the gasification gas in the catalyst bed, not before the catalyst bed, the reaction before the catalyst bed and deactivation of the catalyst can be avoided in the catalytic reforming. Further, higher partial pressure of oxygen and higher feed temperature of the gasification gas can be used in the catalytic reforming.

The method and apparatus offer a possibility to purify the gasification gas and to form the purified gas flow and also products with good properties easily, and energy- and cost-effectively. The present invention provides an industrially applicable, simple and affordable way to treat the gasification gas comprising impurities. Further, the construction of the catalytic reformer can be simplified. The method and apparatus are easy and simple to realize in connection with production processes.

EXAMPLES

Example 1

FIG. 1 presents the method and also the apparatus for converting impurities, such as tars and undesired hydrocarbons, of the gasification gas.

The apparatus comprises a catalytic reformer (2) to which the gasification gas (1) which comprises tars and undesired hydrocarbons is supplied. The catalytic reformer (2) comprises the catalyst bed (3) which is formed from the first catalyst and in which the surface of the catalyst is formed from the second catalyst. Alternatively, the catalytic reformer can comprise two or more catalyst beds. Further, the apparatus comprises at least one injection device for injecting oxygen containing gas (4) by a direct injection onto the surface of the catalyst bed. The oxygen containing gas is supplied via the surface of the catalyst bed to the catalyst bed. In the catalytic reformer (2), the gasification gas (1) is arranged to flow to the catalyst bed (3) and through the catalyst bed and is arranged to contact with the oxygen containing gas (4) in the catalyst bed. Then the gasification gas reacts with the oxygen in the catalyst bed, and the gasification gas is treated by means of a catalytic oxidation and reforming in the catalyst bed. The impurities can be converted during the reaction. Simultaneously, a purified gas (5) is formed during the reaction. The purified gas is discharged from the catalytic reformer (2).

Example 2

In this example, a gasification gas (1) obtained in an atmospheric pressure steam gasification was purified in a separate catalytic reformer (2) according to example 1.

Wood was gasified in the atmospheric pressure dual fluidised-bed steam gasifier operated at 785° C. The raw gas, i.e. the gasification gas, was filtered at 675° C. and led to a reformer which consisted of two sequential bed arranged according to example 1. Both reformer beds were filled with nickel-based catalysts. The raw gas in the inlet of the reformer contained 10.1 g/m³n benzene and 14.6 g/m³n tars including 6.5 g/m³ components heavier than napthtalene. The contents of light hydrocarbon gases in the inlet of the reformer were: methane $CH_4$ 6.55%, ethyne $C_2H_2$ 0.13%, ethene $C_2H_4$ 2.12%, ethane $C_2H_6$ 0.45% and the sum of C3-C5-hydrocarbons 0.08%. A mixture of oxygen and nitrogen was fed to the first catalyst bed with a velocity of 61 m/s and to the second bed with a velocity of 69 m/s. The gas velocity before the first catalyst bed was 0.32 m/s and before the second bed 0.5 m/s. The temperature of the purified gas after the reformer was 906° C.

The purified gas leaving the reformer contained 82 mg/m³n benzene and 40 mg/m³n tars and there were no tars heavier than naphthalene. Methane content was 1.3% and the total of amount C2-C5-hydrocarbon gases was 0.1%. The calculated conversions of C2-C5-hydrocarbon gases and heavy tars were 100%, methane conversion 70.3%, benzene conversion 98.8% and tar conversion 99.9%.

This example was one set point from an extensive test campaign, where a total of 366 hours of operation with various biomass feedstocks including clean wood, bark, forest residues, straw and demolition wood. The reformer was operated without any signs of soot formation or increasing pressure drop and the conversion efficiencies remained high throughout the tests.

Example 3

In this example, a gasification gas obtained in a pressurized steam-oxygen gasification (1) was purified in a separate catalytic reformer (2) according to example 1.

Wood was gasified in the pressurized circulating fluidized-bed gasifier operated at 0.3 Mpa pressure and 920° C. bed temperature and 878° C. in the upper part of the gasier. Steam and oxygen were used as feed gases. The gasification gas was filtered at 664° C. and then led to the reformer. The reformer consisted of two sequential fixed beds with nickel catalyst as the main catalyst and with robust heat shield material containing lower nickel content as the first layer of the catalyst, where the gasification gas and oxygen gas met. The inlet gas velocity before the first bed was 1.0 m/s and the velocity of the oxygen stream was 56 m/s. In the second reformer bed the gas velocity was 1.3 m/s and the velocity of oxygen stream 90 m/s. A mixture of oxygen and steam was used as the oxygen stream.

The reformer was operated at relatively low temperature so that the outlet temperature of the purified gas was 835° C. In this case, the aim was to convert tars and all hydrocarbon gases except methane, as the aim of this test was the production of synthetic natural gas.

The inlet benzene content was 8.1 g/m³n and tar content 2.3 g/m³n. The methane concentration was 5.9% and the sum of C2-hydrocarbon gases was 0.79%. The concentrations determined from the purified gas after the reformer were 686 mg/m³n benzene and 20 mg/m³n tars. The purified gas contained 3.4% methane and the sum of C2-hydrocarbon gases was below 0.1%. The calculated conversion efficiencies were the following: methane 29.8%, benzene 90.0%, tars 99.0% and C2-hydrocarbon gases 100.0%.

Example 3 was one test from an extensive test programme with a total of 4000 hours of operation, where different reformer designs were tested in connection to a pressurized fluidized-bed gasifier. At the end of this test campaign the reformer was built and operated according to example 1, and then there were no signs of soot formation and the reformer was used with stable pressure drop and constant conversion efficiencies.

The gasifier, catalytic reformer, feeding devices and outlet devices of the process used in these examples are known per se in the art, and therefore they are not described in any more detail in this context.

The method and apparatus are suitable in different embodiments for converting the impurities of the gasification gas and for purifying the gasification gas and for forming the purified gas.

The invention is not limited merely to the examples referred to above; instead many variations are possible within the scope of the inventive idea defined by the claims.

The invention claimed is:

1. A method for removing impurities from a gasification gas, wherein
the gasification gas which comprises at least tars and/or undesired hydrocarbons is supplied to a catalytic reformer which comprises at least one catalyst bed formed of catalyst particles, and a feed rate of the gasification gas is 0.1-3 m/s to the catalyst bed,
oxygen containing gas is injected directly onto a surface of the catalyst bed, and a feed rate of the oxygen containing gas is 20-90 m/s to the catalyst bed,
the gasification gas is arranged to flow through the catalyst bed and arranged to contact with the oxygen containing gas in the catalyst bed and to not contact with the oxygen containing gas before the catalyst bed, in which the gasification gas reacts with the oxygen containing gas in the catalyst bed on surfaces of the catalyst particles of the catalyst bed or in pores of the catalyst particles of the catalyst bed, and
a purified gas formed from the reaction of the gasification gas with the oxygen containing gas in the catalyst bed is discharged from the catalytic reformer, wherein a temperature of the purified gas is 850-950° C.

2. The method according to claim 1, wherein the catalyst bed is formed from a first catalyst and the surface of the catalyst bed is formed from a second catalyst, wherein the second catalyst is on the surface of the catalyst bed in which the gasification gas reacts with the oxygen containing gas.

3. The method according to claim 1, wherein the gasification gas is fed before the catalyst bed or directly to the catalyst bed in the catalytic reformer.

4. The method according to claim 1, wherein the content of oxygen in the oxygen containing gas is 10-100 vol-%.

5. The method according to claim 1, wherein the feed rate of the oxygen containing gas is 30-80 m/s to the catalyst bed of the catalytic reformer.

6. The method according to claim 1, wherein the feed rate of the gasification gas is 0.3-2 m/s to the catalyst bed of the catalytic reformer.

7. A use of the method according to claim 1, wherein the method is used in a purification of the gasification gas, a production of the gasification gas, a production of hydrocarbons, a production of methanol, a production of hydrogen, manufacturing of fuels, or their combinations.

8. An apparatus for removing impurities from a gasification gas, wherein the apparatus comprises
at least one catalytic reformer to which the gasification gas which comprises at least tars and/or undesired hydrocarbons is supplied, and the catalytic reformer comprises at least one catalyst bed formed of catalyst particles, and the gasification gas is arranged to flow with a feed rate of 0.1-3 m/s to the catalyst bed, and
at least one injection device for injecting oxygen containing gas directly onto a surface of the catalyst bed so that the oxygen containing gas is arranged to flow with a feed rate of 20-90 m/s to the catalyst bed, and
in the catalytic reformer the gasification gas is arranged to flow through the catalyst bed and arranged to contact with the oxygen containing gas in the catalyst bed and to not contact with the oxygen containing gas before the catalyst bed, in which the gasification gas reacts with the oxygen containing gas in the catalyst bed on surfaces of the catalyst particles of the catalyst bed or in pores of the catalyst particles of the catalyst bed, and in which a purified gas having temperature of 850-950° C. is formed from the reaction of the gasification gas with the oxygen containing gas in the catalyst bed and discharged from the catalytic reformer.

9. The apparatus according to claim 8, wherein the apparatus comprises at least one gasification gas feed inlet for supplying the gasification gas into the catalytic reformer, and the gasification gas feed inlet is arranged in connection with the catalyst bed of the catalytic reformer.

10. The apparatus according to claim 8, wherein the apparatus comprises at least one gasification gas feed inlet for supplying the gasification gas into the catalytic reformer, and the gasification gas feed inlet is arranged before the catalyst bed in the catalytic reformer.

11. The apparatus according to claim 8, wherein the catalyst bed is formed from a first catalyst and the surface of the catalyst bed is formed from a second catalyst, wherein the second catalyst is on the surface of the catalyst bed in which the gasification gas reacts with the oxygen containing gas.

12. The apparatus according to claim 8, wherein the catalytic reformer comprises two catalyst beds.

13. The apparatus according to claim 8, wherein the feed rate of the oxygen containing gas is 30-80 m/s to the catalyst bed of the catalytic reformer.

14. The apparatus according to claim 8, wherein the feed rate of the gasification gas is 0.3-2 m/s to the catalyst bed of the catalytic reformer.

* * * * *